(12) United States Patent
Christ

(10) Patent No.: US 8,820,791 B2
(45) Date of Patent: Sep. 2, 2014

(54) ADAPTER FOR ROLLING BOARDS

(76) Inventor: Olaf Christ, Berlin (DE)

(*) Notice: Subject to any disclaimer, the term of this patent is extended or adjusted under 35 U.S.C. 154(b) by 337 days.

(21) Appl. No.: 13/058,045

(22) PCT Filed: Jul. 24, 2009

(86) PCT No.: PCT/EP2009/005391
§ 371 (c)(1),
(2), (4) Date: Feb. 8, 2011

(87) PCT Pub. No.: WO2010/015338
PCT Pub. Date: Feb. 11, 2010

(65) Prior Publication Data
US 2011/0133440 A1    Jun. 9, 2011

(30) Foreign Application Priority Data
Aug. 8, 2008  (DE) .................. 10 2008 037 124

(51) Int. Cl.
*A63C 11/00* (2006.01)
(52) U.S. Cl.
USPC ................ 280/809; 280/14.21; 280/14.23
(58) Field of Classification Search
USPC ............ 280/14.21, 14.23, 11.14, 7.12, 7.13, 280/7.14, 87.021, 87.022, 618, 607, 304.1, 280/809
See application file for complete search history.

(56) References Cited

U.S. PATENT DOCUMENTS

| | | | | |
|---|---|---|---|---|
| 3,153,543 A | * | 10/1964 | Magyar | 280/7.13 |
| 3,982,766 A | * | 9/1976 | Budge | 280/87.042 |
| 4,130,292 A | * | 12/1978 | Lorenz | 280/87.042 |
| 4,149,735 A | | 4/1979 | Blackburn | |
| 4,200,302 A | * | 4/1980 | de Rosnay | 280/7.12 |
| 4,403,785 A | * | 9/1983 | Hottel | 280/14.23 |
| 4,740,000 A | * | 4/1988 | Moessner | 280/7.12 |
| 5,054,807 A | * | 10/1991 | Fauvet | 280/607 |
| 5,285,742 A | * | 2/1994 | Anderson | 280/14.24 |
| 5,765,854 A | * | 6/1998 | Moore et al. | 280/618 |
| 5,895,068 A | * | 4/1999 | Doyle | 280/618 |
| 6,012,555 A | * | 1/2000 | Duran et al. | 280/304.1 |
| 6,481,725 B2 | * | 11/2002 | Chou | 280/7.14 |
| 6,808,183 B2 | * | 10/2004 | Schaller et al. | 280/14.22 |
| 6,866,273 B2 | * | 3/2005 | Barbieri et al. | 280/14.21 |
| 7,384,048 B2 | * | 6/2008 | Cerrito | 280/14.22 |
| 7,946,608 B2 | * | 5/2011 | Riepler et al. | 280/11.14 |
| 2003/0160411 A1 | | 8/2003 | Turner | |
| 2003/0201620 A1 | | 10/2003 | Seelye | |

FOREIGN PATENT DOCUMENTS

| | | |
|---|---|---|
| DE | 20102476 U1 | 6/2001 |
| DE | 20107162 U1 | 2/2002 |
| DE | 20118032 U1 | 5/2002 |
| DE | 20 2004 007 065 U1 | 8/2004 |
| DE | 20 2004 010 126 U1 | 1/2005 |

* cited by examiner

*Primary Examiner* — Hau Phan
(74) *Attorney, Agent, or Firm* — SpryIP, LLC

(57) ABSTRACT

In one embodiment, an adapter for a board (1) is provided, comprising at least two different receptacles (20) for attaching different types of chassis.

25 Claims, 3 Drawing Sheets

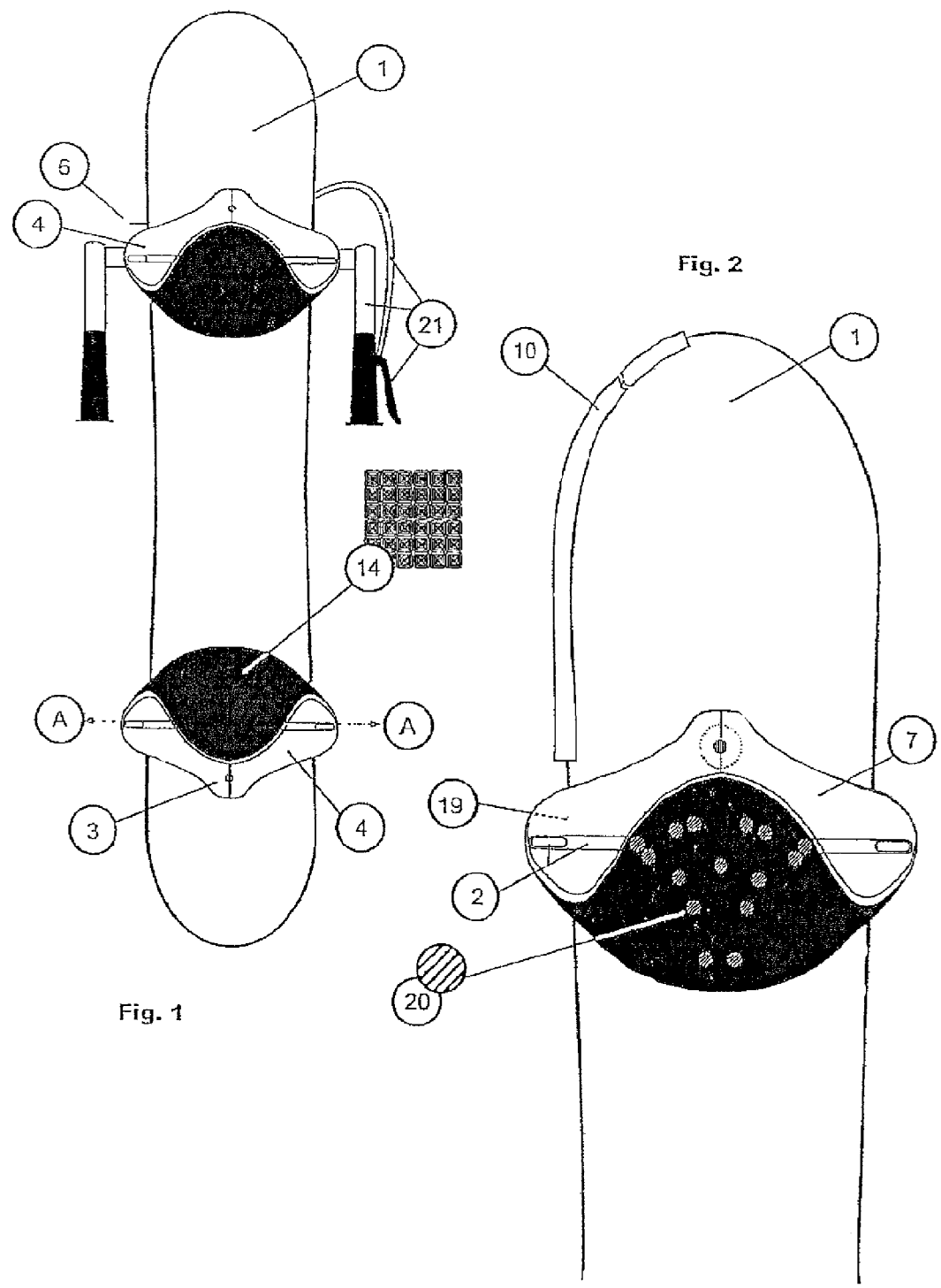

ADAPTER FOR ROLLING BOARDS

FIELD OF THE INVENTION

The present invention relates to adapters for rolling boards and also to rolling board systems having corresponding adapters.

BACKGROUND OF THE INVENTION

Various rolling boards are commercially available nowadays for exercising various types of board sports. The best known rolling boards are those known as skateboards, other types of rolling boards including longboards, mountainboards, flowboards, freeboards, downhill boards, which have brakes, street luges, kickboards (essentially scooters), T-boards, road boards or windsurf boards, wherein the last-mentioned boards have a sail. These various rolling boards differ from one another for example in the length or thickness of the axles used or the diameter of the wheels used. Some kinds of rolling board have additional particular features, for example the abovementioned sail in the case of windsurf boards, a brake for braking at least one axle in the case of downhill boards, or a handlebar or steering rod in the case of kickboards.

In winter, use is made moreover of what are known as snowboards, which have no wheels.

A number of the abovementioned rolling board types are defined and explained in more detail in the following.

A longboard is a special skateboard which is longer than conventional skateboards (generally between 90 and 150 cm) and has a longer wheelbase. Generally, larger wheels made of usually softer material are attached to a longboard than are used in a conventional skateboard. By improving the ride stability, soft and larger wheels (which reduce rolling resistance by absorbing unevennesses more effectively) and the longer wheelbase allow higher speeds than with a standard skateboard.

Visually and technically, a mountainboard, or all-terrain board, is a mixture of a skateboard and a snowboard for traveling by rolling board off-road.

A flowboard is a form of skateboard which attempts to imitate the properties of a snowboard. In this case it is a matter of carving in particular. The flowboard consists of a skateboard-like board (also called a "deck"), to the front and rear of which metal arcs having about seven wheels each are fastened.

A freeboard is a skateboard-like board, which simulates the traveling behavior of a snowboard on asphalt. In addition to the pure carving behavior of a skateboard or longboard, the freeboard allows lateral sliding movements and also sudden braking by putting the freeboard into a horizontal position in relation to the slope.

A T-board and a road-surf board are forms of skateboard having two wheels and attempt to imitate the properties of a snowboard. They differ from the traditional skateboard in a similar way to how a roller skate differs from an inline skate. Traveling on only two wheels simulates traveling on the edge in snowboarding. T-boards and road-surf boards allow in this case an angle of inclination of 60 degrees, similar to that of a snowboard, in contrast to an angle of inclination of 25 degrees in the case of a skateboard.

A windboard is a skateboard or longboard to which a windsurfing sail is fastened and allows windsurfers to exercise leisure and training options.

The term road luge (or street luge) designates a gravity-dependent extreme sport, in which a kind of oversized, usually self-constructed skateboard is lain on to travel down paved roads. It is a type of tobogganing, but without snow.

It should be noted that the above kinds of rolling board are to be understood merely as examples and the invention is not restricted to these kinds of rolling board.

The abovementioned carving is a development of the conventional skiing technique, in which turns are made completely on the steel edges, rather than drifting through the curve. Snowboarding made the carving technique popular as a result of the completely different feeling associated with traveling on the edge.

In order to be able to exercise various board sports, for which different kinds of rolling boards are necessary, it is therefore necessary to buy a corresponding number of different rolling boards, this being associated with correspondingly high costs.

SUMMARY OF THE INVENTION

It is therefore an object of the invention to provide adapters and a corresponding system, with which it is possible to change cost-effectively between different kinds of rolling board.

According to a first aspect of the invention, an adapter for a board is provided, wherein the adapter comprises a plurality of receptacles for receiving different chassis. With such an adapter, different chassis, for example a chassis for a longboard, a chassis for a mountainboard or a chassis for another kind of rolling board, can be attached to a single board.

The receptacles may in this case comprise in particular threaded bores and/or bores or holes for accommodating screws for fastening different chassis. In this case, use can be made of the fact in such an embodiment that the fastening possibilities for different types of chassis are standardized and so the corresponding receptacles for receiving different standard chassis can be provided.

According to a further aspect, an adapter for a board is provided, wherein the adapter comprises a receptacle on the underside for a chassis and wherein the adapter comprises a fastening element on the top side for a sail and/or a steering rod. With such an adapter, the board can be used both as a simple skateboard and, when equipped with a sail or a steering rod, as a windsurf board or kickboard.

According to a third aspect of the invention, an adapter is provided for extending an axle, wherein the adapter has an internal thread for coupling to an axle and an external thread for coupling to a wheel. The thread size of the internal thread can be the same as or different from the thread size of the external thread, and so both simple extension using the same wheels and extension with simultaneous changing of the thread in order to use different wheels are possible.

The first aspect and the second aspect of the invention can be combined in one adapter.

An embodiment of a system according to the invention comprises one or more adapters as defined above.

In addition, such a system can contain a handle, a windsurfing sail, an edge protector for a board and/or a board. In the latter case, an adapter according to the first and/or second aspect can be integrated into the board.

BRIEF DESCRIPTION OF THE DRAWINGS

The invention is explained in more detail below by means of embodiments. The invention is explained in more detail below by means of embodiments with reference to the appended drawing, in which:

FIG. 1 shows a plan view of the top side of a board, said board being equipped with adapters according to an embodiment of the present invention, FIG. 2 shows a plan view of the underside of the board in FIG. 1.

DETAILED DESCRIPTION

Embodiments of the present invention are explained in the following text. These embodiments are to be considered merely as being by way of example, but not as limiting. It should be noted that the description of an embodiment having a multiplicity of components should not be interpreted as meaning that all of these components are necessary in order to implement the present invention. Rather, fewer components and/or alternative components can be provided in other embodiments.

Figure 3:
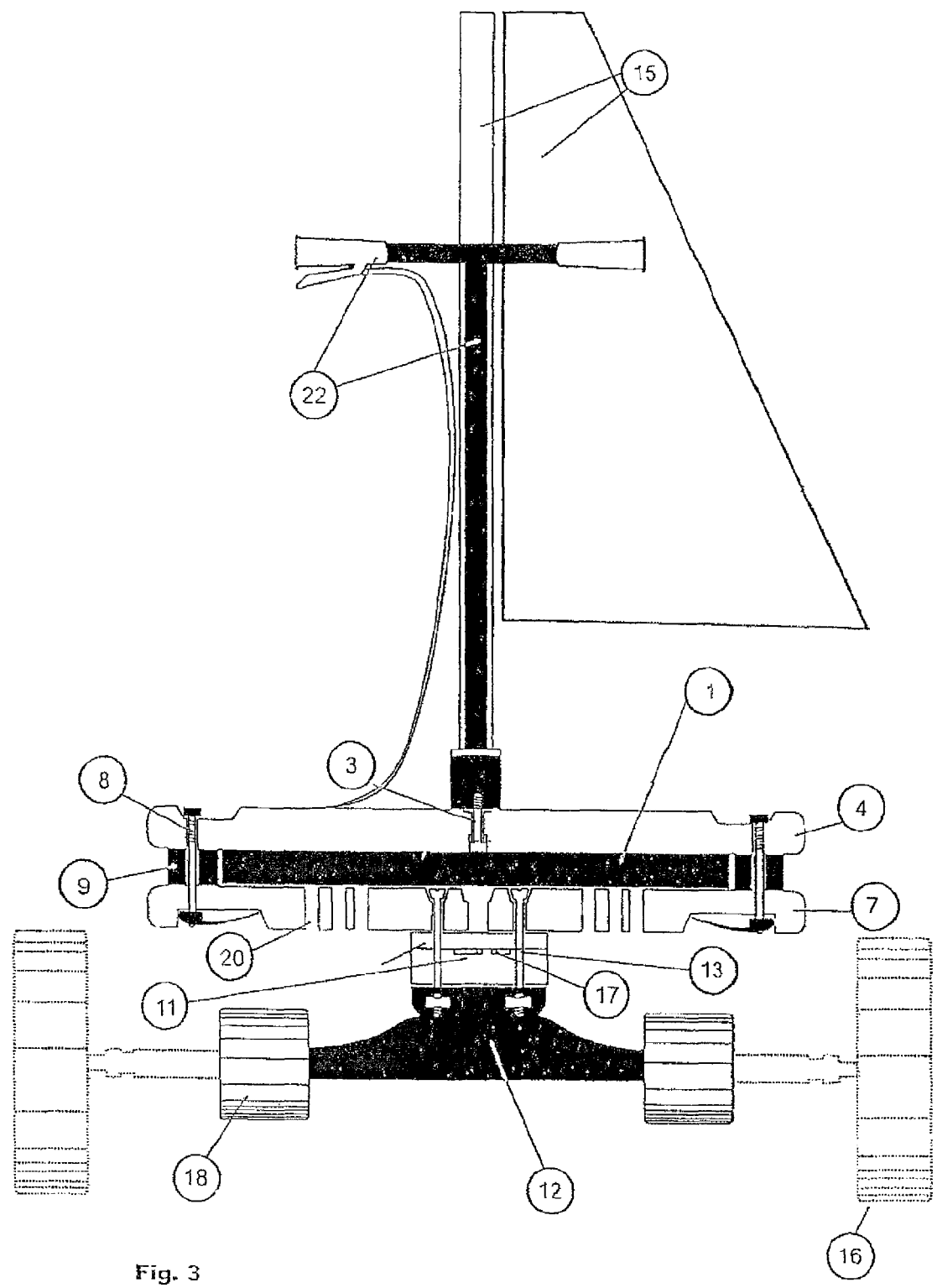
FIG. 3 shows a cross-sectional view of the board in FIGS. 1 and 2, wherein the board in FIG. 3 is equipped with different additional components than in FIG. 1 and FIG. 2.

A first embodiment of the present invention is described with reference to FIGS. 1 to 3. Here, FIG. 1 shows a plan view of the top side of a board 1 having two embodiments of an adapter according to the invention. FIG. 2 shows a partial plan view of the underside of the board in FIG. 1, and FIG. 3 shows a side view. In order to illustrate various ways of using the adapter according to the embodiment in FIGS. 1 to 3, partly different elements are assembled on the adapter in FIGS. 1 to 3.

The adapter in FIGS. 1 to 3 comprises an upper binding plate 4 and a lower binding plate 7, which have a protrusion 6 in each case at the longitudinal sides of the board 1 used. The board 1 can in this case be for example a snowboard or a board constructed like a skateboard. As can be seen in particular in FIG. 3, the upper binding plate 4 and the lower binding plate 7 are connected in the region of the protrusion 6 by a quick-release clamp 8 having an eccentrically mounted clamping lever. In the embodiments in FIGS. 1 to 3, the lower binding plate 7 has a guide 2 provided to accommodate a clamping lever of the quick-release clamp 8, and the upper binding plate 4 has a corresponding slot or a corresponding depression for accommodating a nut of the quick-release clamp 8. Whereas in the embodiment in FIGS. 1 to 3 the quick-release clamps 8 are arranged such that the respective clamping lever is held in the guide 2 of the respective lower binding plate 7, the reverse arrangement, i.e. accommodating the clamping lever in the upper binding plate 4, or fastening without a quick-release clamp, for example using screws and nuts, is also possible. In the embodiment in FIGS. 1 to 3, spacer sleeves 9 are furthermore provided on the shafts of the quick-release clamps 8, wherein the height of the spacer sleeves 9 corresponds to the thickness of the board 1.

In the embodiment in FIGS. 1 to 3, a chassis can be attached to each adapter, in particular to the respective lower binding plate 7, as will be explained in more detail later. In order thus to obtain a rolling board with two chassis, in particular with two axles, two adapters of this kind can, as illustrated in FIG. 1, be attached to the board 1, wherein the position of the adapter in one embodiment can be selected in an infinitely variable manner corresponding to the desired position of the chassis. In particular, in one embodiment which uses quick-release clamps such as the quick-release clamp 8, the adapters can be displaced in a simple manner along the board, in order to be able to set different chassis spacings and positions or wheelbases and axle positions in an infinitely variable manner.

The fastening of a chassis 12 to the lower binding plate 7 according to one embodiment is illustrated in FIG. 3. In this embodiment, the chassis 12 are connected to the lower binding plate 7 by means of countersunk connecting screws 13, wherein one or more spacers 11 (two in the example in FIG. 3) are provided in order to set a spacing of the chassis 12 from the lower binding plate 7. In one embodiment of a system according to the invention, a plurality of spacers 11 of different thicknesses are provided in order to be able to set the spacing of the chassis 12 from the lower binding plate 7 in accordance with a desired type of rolling board.

In one embodiment, one or more spacers have clearances 17 in order to be able to receive required tools, for example screwdriver or wrench for tightening the connecting screws 13.

In order to accommodate the connecting screws 13, a multiplicity of holes 20 are provided in the lower binding plate 7. As can be seen in particular in FIG. 2, in this case a multiplicity of holes 20 are provided for holding different chassis. In this regard, it should be noted that a screw pattern or screw spacing for different types of chassis, for example chassis for skateboards, longboards, mountainboards etc., is standardized or specified in another manner, and in one embodiment of the invention, the screw holes 20 are arranged in a manner corresponding to two or more of these standardized or specified chassis screw patterns. In this way, in such an embodiment, different types of chassis can be attached to one and the same binding plate in a simple manner.

In the embodiment in FIGS. 1 to 3, the upper binding plate 4 also has holes for accommodating screws and/or another fastening element. In particular, in the embodiment as shown in FIG. 3, a fastening possibility 3 for a windsurfing sail 15 or for a scooter steering rod 22, having a handgrip and brake, is provided. In addition, in one embodiment a safety belt, a carrying strap, a lock for theft prevention or a line for pulling the board can be fastened to this or another fastening means.

In one embodiment, one or more further holes or fastening possibilities can furthermore be arranged on the upper binding plate 4, for example in order to fasten a foot strap to provide a better connection between a rider and the board.

The abovementioned guide 2 or a corresponding slot in the upper binding plate 4 can, in one embodiment, serve at the same time as a fastening possibility for handgrips 21 having a braking system, as are illustrated by way of example in FIG. 1. In this way, the board can be used in a simple manner as what is known as a street luge or roller sled or roller bob, wherein the rider sits in this case on the upper binding plate 4 which is at the rear in the direction of travel with his legs lying on the board in the direction of travel and uses said upper binding plate 4 as a seat. The handgrips are used in this case for holding on to and the brake for regulating the speed.

One or both of the upper binding plates 4 can be provided in the embodiment in FIGS. 1 to 3 with a nonslip structure 14, which reduces the risk of sliding away. Such a nonslip structure 14 can comprise for example ribs, wherein the ribs can have different sizes and arrangements.

Markings 19 can be provided on the lower binding plates 7 and/or on the upper binding plates 4 in order to simplify the orientation of the binding plates with respect to the longitudinal axis of the board and thus to simplify the correct fitting of the binding plates.

In addition, the slot 2 can serve as a guide for a brake cable of a brake for one axle, for example a Bowden cable.

In one embodiment of a system according to the invention, different chassis 12 are fastened to a plurality of lower binding plates 7 by means of corresponding connecting screws 13 and spacers 11. In this way, it is possible to convert a board particularly quickly, since the lower binding plate 7 having mounted chassis 12 can be exchanged rapidly by means of quick-release clamps such as the quick-release clamps 8.

In another embodiment, the upper binding plate 4 and/or the lower binding plate 7 are integrated fixedly with a specially correspondingly equipped board 1. In the case of such a board, only the chassis then has to be exchanged.

In a further embodiment of a system according to the invention, a snowboard is used as the board 1. In this way, a snowboard can easily be converted into a skateboard. In such a system, an edge protector 10 can be provided in order to protect the edges of the snowboard. In principle, such an edge protector can also be used in a board other than a snowboard.

Embodiments of an adapter according to the invention for fastening various chassis, a steering rod, handgrips and/or a windsurfing sail were discussed above with reference to FIGS. 1 to 3. It should be noted that embodiments of the present invention do not necessarily have to have all the above-discussed fastening possibilities, but rather some embodiments only have some of these possibilities.

Figure 4:
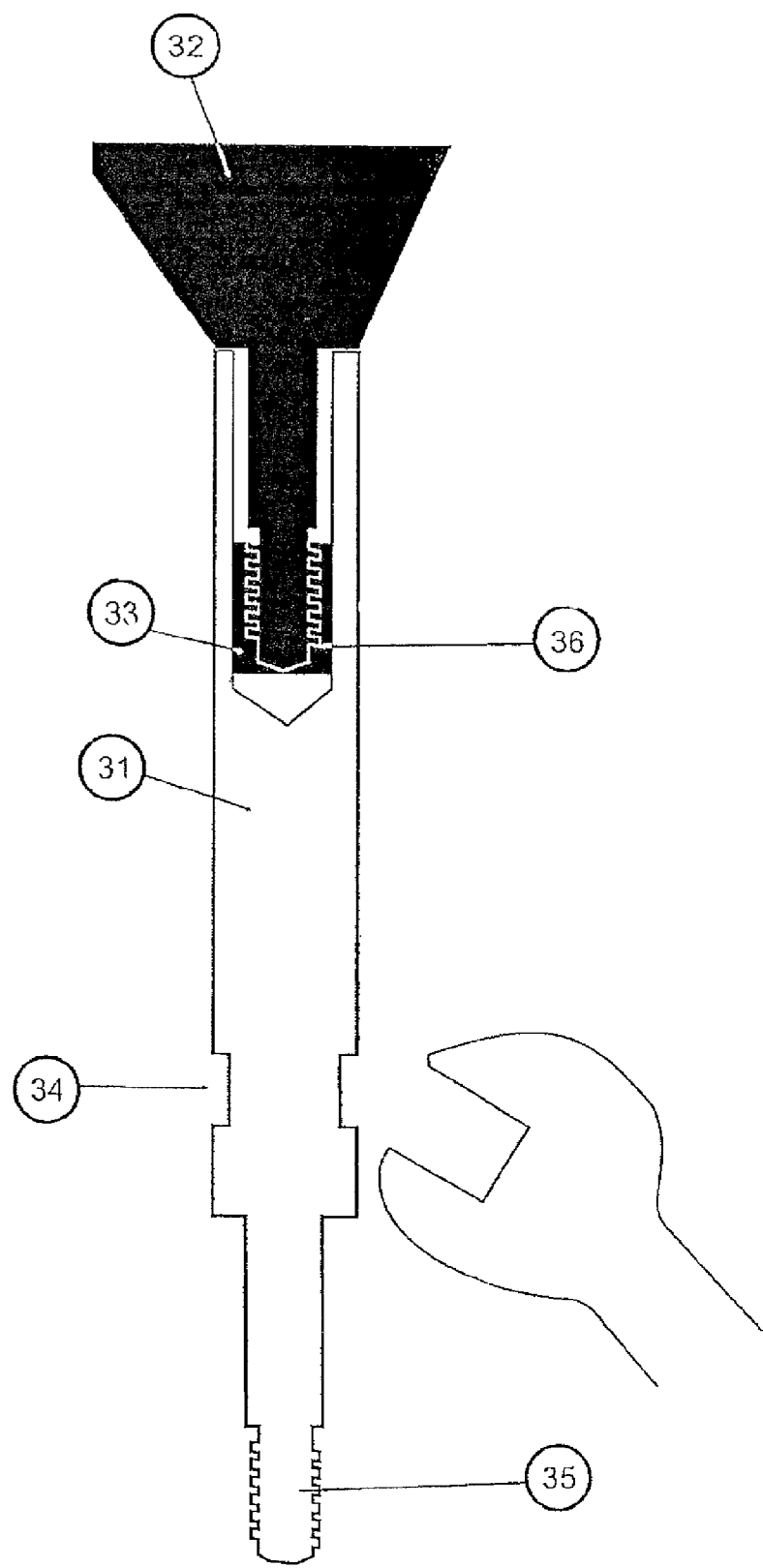
FIG. 4 shows a cross-sectional view of an adapter according to another embodiment of the invention.

A further embodiment of an adapter according to the invention is described in the following text with reference to FIG. 4. The adapter according to the embodiment in FIG. 4 is used in this case in particular for extending a rolling board axle. The adapter of the embodiment in FIG. 4 comprises an elongate body 31, which has an external thread 35 at one end and a bore with an internal thread 36 at another, opposite end. A thread stopper 33 can additionally be arranged in the bore. In addition, the elongate body 31 has a gripping point 34, which is designed to be held by a wrench. For fitting, the adapter of the embodiment in FIG. 4 is screwed by means of the internal thread 36 onto an axle 32 of a rolling board chassis, wherein the corresponding external thread of the axle 32 otherwise serves to hold a corresponding wheel, which is removed for example before the adapter is fitted. A wheel is then screwed onto the external thread 35.

Here, the thread size of the thread 35 can correspond to the thread size of the thread 36. In this case, the adapter represents in a simple manner an extension of the axle and the same wheel can be screwed onto the thread 35 as is screwed onto the axle 32. In another embodiment, the thread 35 differs from the thread 36 and has for example a different thread diameter. In this case, a different wheel, for example a larger wheel or a smaller wheel, can be screwed onto the thread 35 than is screwed onto the axle 32. For example, the threads 35 and 36 can be what are known as G1 threads, by means of which for example a skateboard axle is converted into a stronger and longer longboard axle having the same threads for fastening the same wheels as are fastened to the skateboard axle. In another embodiment, the thread 36 is what is known as a G1 thread and the thread 35 is a larger thread, for example a G2 thread. A skateboard axle can be converted herewith into a stronger and longer mountainboard axle having a larger thread for fastening mountainboard tires. This is also illustrated schematically in FIG. 3, wherein the skateboard wheels are designated by the reference sign 18 and the adapter and the larger mountainboard tires 16 screwed onto the adapter are illustrated by dashed lines.

In yet another embodiment, the thread 36 can be a larger thread, for example a G2 thread, and the thread 35 a smaller thread, for example a G1 thread. With such an adapter, a mountainboard axle for example can be converted into a longboard axle having a thread for fastening smaller wheels such as the wheels 18 from FIG. 3.

As can be seen from FIG. 3, the embodiment of FIG. 4 can be combined with the adapter explained with reference to FIGS. 1 to 3. As described in detail above, different variations and modifications of the embodiments illustrated are furthermore possible, and so the invention is not restricted to the embodiments illustrated.

The invention claimed is:

1. An apparatus, comprising:
   an adaptor, including:
   at least two different receptacles for attaching different types of chassis,
   an upper binding plate,
   a lower binding plate, and
   at least one connecting element for connecting the upper to the lower connecting plate such that a board can be clamped between the upper binding plate and the lower binding plate, wherein the at least two different receptacles are provided in the lower binding plate, and wherein the board provides a user interface for the apparatus.

2. The apparatus as claimed in claim 1, wherein the at least two different receptacles comprise a plurality of holes for accommodating fastening screws.

3. The apparatus as claimed in claim 1, wherein the at least two different receptacles are configured for the attachment of different standardized types of chassis.

4. The apparatus as claimed in claim 1, wherein the different types of chassis are selected from the group consisting of skateboard axles, skateboard chassis, longboard chassis, mountainboard chassis, flowboard chassis, freeboard chassis, T-board chassis, road-surf chassis and chassis that can be braked.

5. The apparatus as claimed in claim 1, wherein the connecting element comprises a quick-release clamp.

6. The apparatus as claimed in claim 1, wherein the top side of has a nonslip structure.

7. The apparatus as claimed in claim 1, wherein the top side of has a fastening element for fastening at least one of a sail or a steering rod.

8. The apparatus as claimed in claim 1, wherein the top side of has at least one of a non-slip structure, a fastening element for fastening a sail or a fastening element for fastening a steering rod, and wherein the top side of is the top side of the upper binding plate.

9. The apparatus as claimed in claim 1, wherein the adapter is configured such that the position of the adapter on the board is adjustable.

10. The apparatus as claimed in claim 1, wherein the adapter comprises a marking for orienting the adapter on the board.

11. The apparatus as claimed in claim 1, wherein the adapter has a receptacle for at least one of a handgrip or a Bowden cable.

12. The apparatus as claimed in claim 1, comprising fastening means for fastening the adapter to a board.

13. The apparatus as claimed in claim 1, wherein the board is to at least partially support at least a partially covered or uncovered portion associated with a user of the apparatus.

14. The apparatus as claimed in claim 1, wherein the board is to directly at least partially support a user of the apparatus.

15. An apparatus, comprising:
   a top side, wherein the top side is provided with a fastening element for at least a sail or for a steering rod,
   an underside, wherein the underside is provided with at least two receptacles a chassis, an upper binding plate for the top side, a lower binding plate for the underside, and at least one connecting element for connecting the upper to the lower connecting plate such that a board can be clamped between the upper binding plate and the lower binding plate, wherein the at least two receptacles are provided in the lower binding plate, and wherein the board provides a user interface for the apparatus.

16. The apparatus as claimed in claim 15, wherein the connecting element comprises a quick-release clamp.

17. The apparatus as claimed in claim 15, wherein the board is to at least partially support at least a partially covered or uncovered portion associated with a user of the apparatus.

18. The apparatus as claimed in claim 15, wherein the board is to directly at least partially support a user of the apparatus.

19. An apparatus, comprising:

at least one adapter comprising at least two different receptacles for attaching different types of chassis, at least one further adapter, the further adapter comprising:

an elongate body, wherein, at a first end, the elongate body has a cavity with an internal thread, wherein, at a second end opposite the first end, the elongate body has an external thread, wherein the internal thread is dimensioned for coupling to a rolling board axle, and wherein the external thread is dimensioned for coupling to a rolling board wheel.

20. The apparatus as claimed in claim 19, further comprising at least one spacer for setting a spacing of a chassis from the at least one adapter.

21. The apparatus as claimed in claim 19, further comprising a board.

22. The apparatus as claimed in claim 21, wherein the at least one adapter is integrated into the board.

23. The apparatus as claimed in claim 21, wherein the board is a snowboard.

24. The apparatus as claimed in claim 19, comprising at least one element for attaching to the at least one adapter, wherein each element of the at least one element is selected from the group comprising a sail, a steering rod, a handgrip and a chassis.

25. The apparatus as claimed in claim 19, further comprising an edge protector for attaching to one edge of a board.

\* \* \* \* \*